Oct. 9, 1956  F. G. GRAVES  2,765,779
INTERNAL COMBUSTION ENGINE CONSTRUCTION
Filed Nov. 9, 1951  5 Sheets-Sheet 5

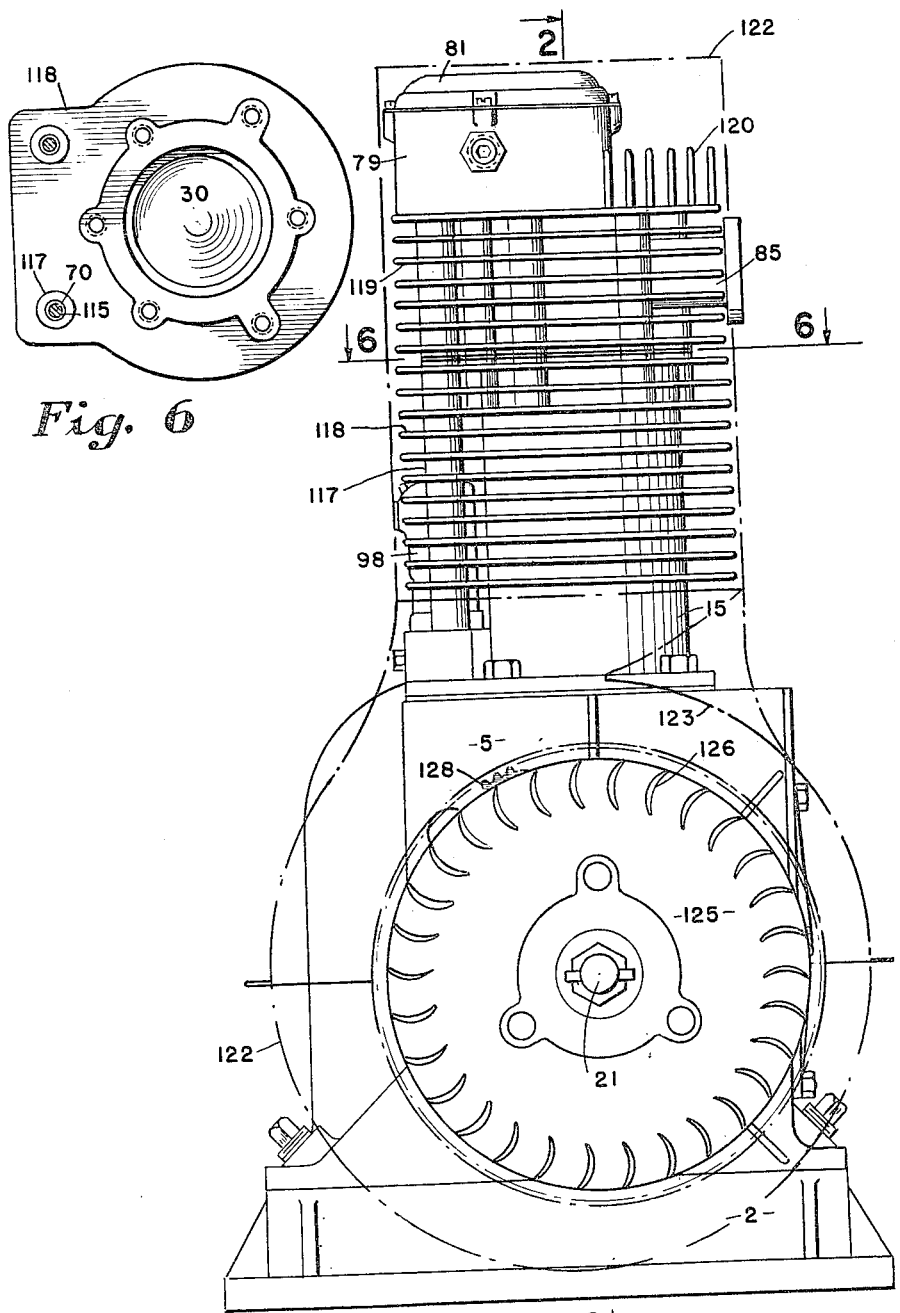

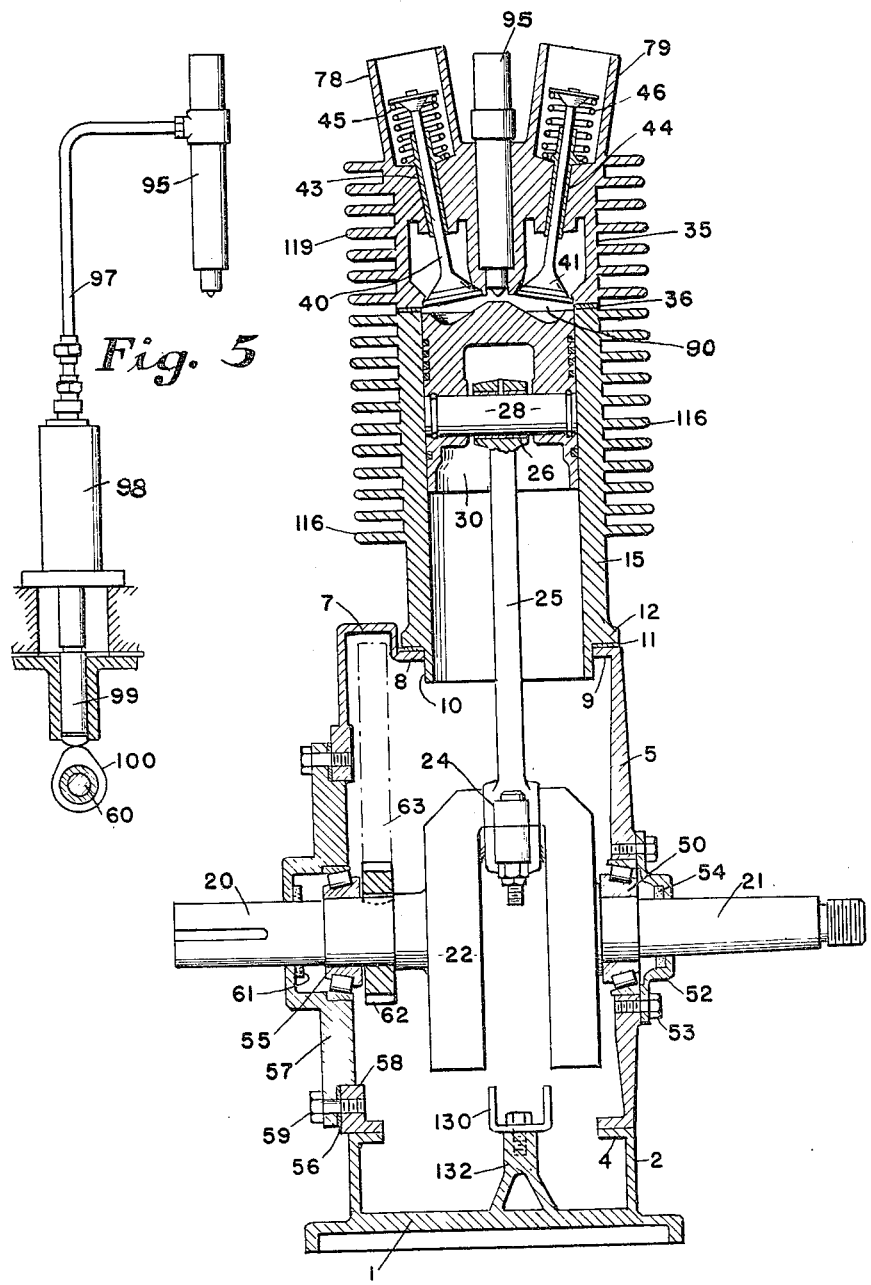

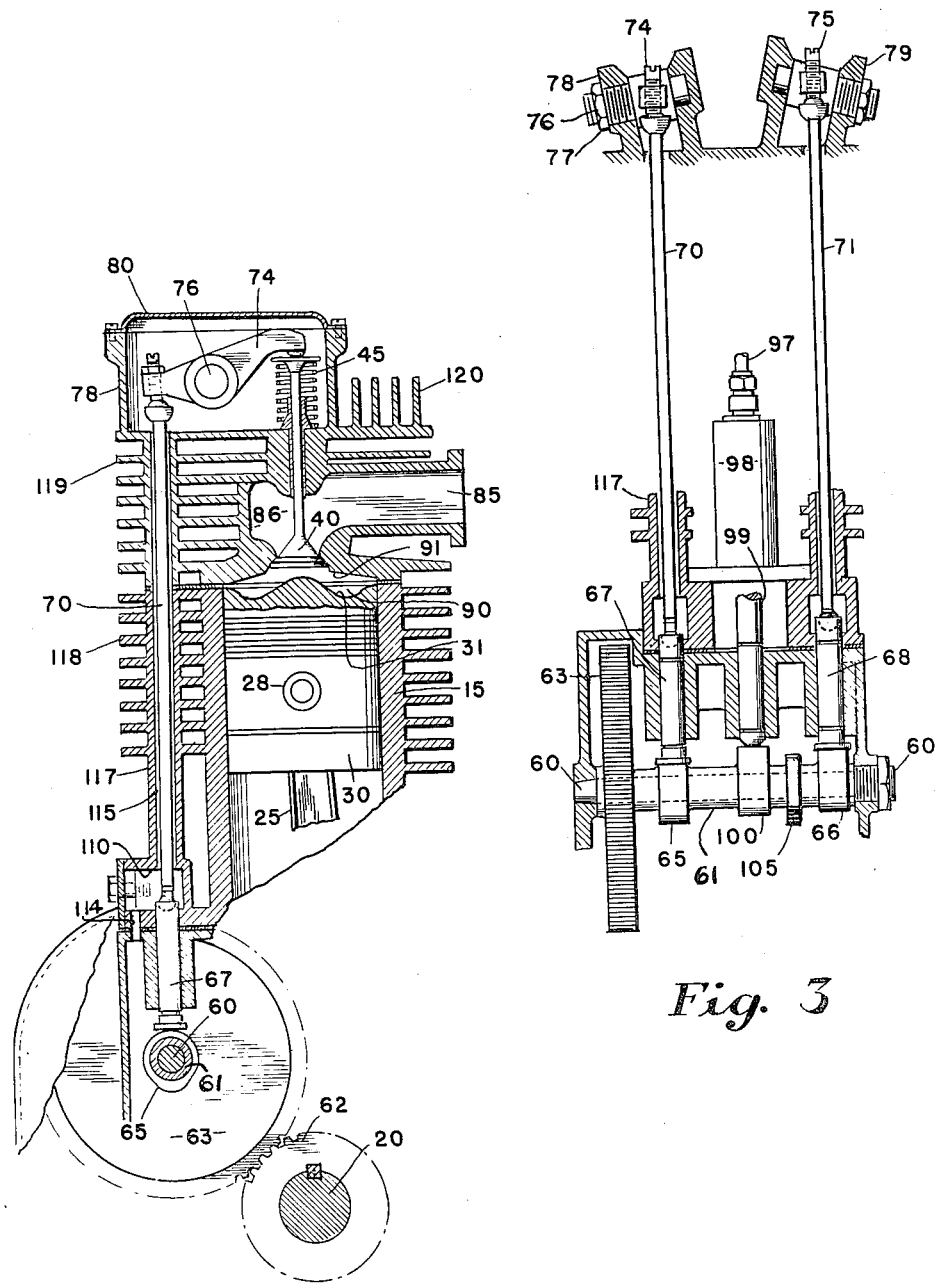

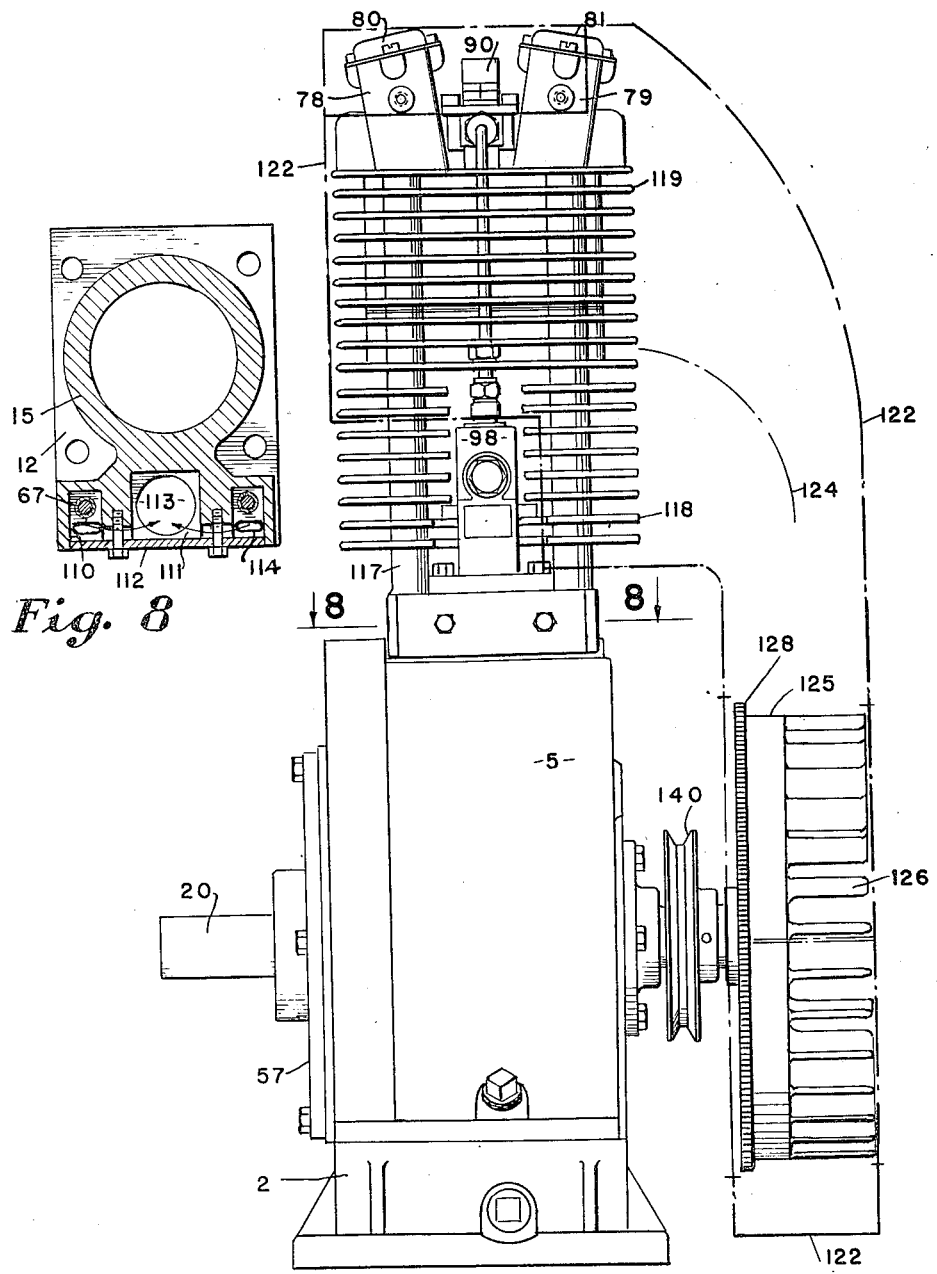

INVENTOR.
FREDERICK G. GRAVES,
BY
Justin C. Macklin
ATTY

United States Patent Office 2,765,779
Patented Oct. 9, 1956

2,765,779

INTERNAL COMBUSTION ENGINE CONSTRUCTION

Frederick G. Graves, Cleveland, Ohio, assignor, by mesne assignments, to Justin W. Macklin, Cleveland, Ohio, as trustee Application November 9, 1951, Serial No. 255,679

1 Claim. (Cl. 121—194)

This invention relates to internal combustion engines and is particularly concerned with providing an engine of such design that it is capable of being cheaply manufactured; is light in weight in proportion to the horse power developed; may be readily assembled and yet which has all parts so mounted as to be readily removable for inspection, replacement, etc.

The objects include the provision of such an engine which lends itself particularly well to air-cooling which, while primarily the compression ignition type or diesel type of engne, may be readily converted to spark ignition.

Features include so arranging the camshaft and valve actuating rods as to effectively lubricate and cool the valves by circulation from oil in the crank case effecting cooling of the oil on its return. Conversely, the oil will be heated to desired temperature.

As a compression ignition engine, provision is made not only for the simple assembly and assured alignment of cylinder, piston, connecting rod and crank, but also a convenient, effective and novel means is provided for varying the compression ratio by changing the position of the cylinder and cylinder head with relation to the axis of the crankshaft.

More specific objects include simple and effective arrangement of the cylinder head and valves therein to provide maximum opening and most effective uniform uninterrupted surfaces on the inside of the combustion chamber.

The engine is designed primarily to operate on four-stroke cycle. It has its parts so grouped and assembled as to provide for necessary auxiliary mounting and functioning. Features include so locating and protecting the fuel injector pump as to afford convenience for mounting and operating components such as lubricating pump, starting motor connected with the flywheel, an air-cooling fan impeller carried by the flywheel, and various other features of refinement and effectiveness which make for the desired lightness of weight, efficiency in operation, compactness and accessibility of parts, and overall pleasing appearance.

A preferred embodiment of my engine is illustrated in the accompanying drawings to which the following description relates, and from which other advantages and desirable characteristics will become apparent.

Fig. 1 is a side elevation of my engine, showing the flywheel end of the crankshaft, and with some accessories omitted;

Fig. 2 is a vertical section taken substantially on a plane, indicated by the line 2—2 of Fig. 1, showing the crankshaft, piston, connecting rod and intake and exhaust valves, etc.;

Fig. 3 is a fragmentary sectional view showing the camshaft and valve operating rods and connections;

Fig. 4 is a fragmentary view showing one valve, its rocker, actuating rod and cam;

Fig. 5 is a similar fragmentary view showing the cam and connections for fuel pump and injector;

Fig. 6 is a horizontal view of the top of the cylinder block and piston, showing the position of the valve-actuating rods, and with the cylinder head and valves removed. The plane of the view is indicated by the line 6—6 of Fig. 1;

Fig. 7 is a side view of the engine, looking from the left in Fig. 1;

Fig. 8 is a section through the lower part of the cylinder block, as indicated by the line 8—8 of Fig. 7;

Figure 11:
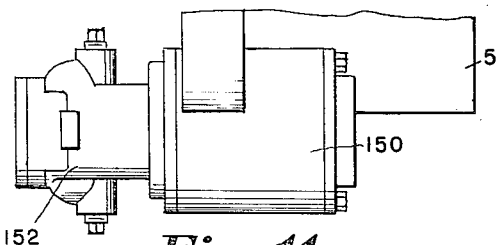
Fig. 11 is a plan view of the oil pump, the direction of the view being indicated by the arrow and large numeral 11 in Fig. 10.

Referring to the drawings by the use of reference characters, as shown, the crank case comprises a base 1 having upwardly extending side walls 2 and inturned flanges 4, these walls and flanges being rectangular in shape, and acting to support a housing member 5 having side and end walls, and a top 7 provided with a flange portion 8. This top wall has a circular opening 9 therein to receive and effect alignment of the flange 10 projecting downwardly from the shoulder 12 of the cylinder proper 15.

Mounted in suitable bearings to be described is a crank comprising main shaft sections 20 and 21, crank arms 22 and a journal bearing receiving the journal 24 of the connecting rod 25 journaled again at 26 to the piston wrist pin 28 of the piston 30.

Fitted on the flat surface at the upper end of the cylinder 15 is a cylinder head member 35, resting on a gasket 36 and affording a mounting for intake and exhaust valves 40 and 41, respectively, each having a valve stem slidable through a supporting sleeve 43 and 44, and urged to closed position by springs indicated at 45 and 46 in substantially the usual manner.

Referring again to the crank case, one wall is provided with an opening for receiving a roller bearing 50 fitted over the shaft 21 and against a shoulder adjacent to the crank proper, and held in position by a cap member 52 secured by screws indicated at 53, and also provided with an oil sealing ring 54. The crank portion 20 is supported by a similar bearing 55 carried in a recess formed in a larger cover plate closure 57 having an offset and accurately aligning portion fitting an opening 58 in the crank case and secured by screws, as indicated at 59. Here again, an oil sealing ring 61 is carried in the recess and fits the shaft 20.

The opening 58 is large enough to permit the crank 22 to pass bodily therethrough and to allow access to the crank for completing the assembly.

From the arrangement so far described, it will be seen that the crankshaft may be inserted through the opening 58 with its bearings in position, and the cover 57 may be secured with facility and convenience, thus mounting the crankshaft in its supporting housing.

The bearings 50 and 55 being roller bearings, each with a tapered outer race, as shown, very thin gasket or packing sheets 56 under the flange of a cover 57 may constitute a convenient means of adjusting these bearings in the first instance and later for wear, it being only necessary to remove a thin sheet from beneath the flange of the cover, and again tighten it in position.

Such gasket sheets may, of course, be paper thin to provide for accurate adjustment. The connecting rod 25 may now be attached to its journal, and the crank and its casing may be set upon the base, leaving the piston on the connecting rod projecting upwardly therefrom. The cylinder 15 may now be placed over the piston, and its guiding flange 10 slipped into the closely-fitting opening 9.

Gasket rings, indicated at 11, of varying thickness and number establish the height of the cylinder head, and thus its distance from the axis of the crank. By varying the thickness of the gaskets at 11 the volume of the compression chamber may be changed, thus varying the compression ratio. That is, when the piston is in its uppermost or inner position, shown in Fig. 2, it has compressed the fresh charge, and the stroke being a fixed factor the volumetric value and thus the temperature of the air will depend upon the distance of the piston head surface from that of the inner face of the cylinder head.

Referring to Figs. 3 and 4, a hollow camshaft 61 on a spindle 60 is shown as driven by a gear 62 on the crankshaft 20 meshing with the gear 63 on the camshaft. The ratio between these two gears is that of one to two, so that the camshaft makes one revolution for two of the crankshaft.

On the camshaft are intake and exhaust cams 65 and 66, respectively, which cause reciprocation of slide members or tappets 67 and 68 for actuating the valve rocker arm push rods 70 and 71, respectively.

Rocker arms of the usual construction shown at 74 and 75 are mounted on pivot pins, one of which is shown at 76 for the arm 74 removably mounted in its upwardly projecting housing 78 formed on the cylinder head. Each of these pins is threaded into the wall of its housing and may be held by a lock nut as at 77. The housing for the rocker arm 75 is designated 79. A suitable cover indicated at 80 closes the top of the housing 78, and a like cover is designated 81 for the housing 79.

The upper end of the push rod 70 may act through the usual ball joint to push upwardly on one end of the lever 74, while its other end pushes downwardly on the outer end of the valve stem, compressing the spring 45.

According to the usual fashion of operation of such valves for four-cycle operation, at a different portion of the cycle of revolutions of the crankshaft and actuation of the piston 30, the exhaust cam 66, through the rod 71 and rocker arm lever 75, opens the exhaust valve 41.

In Fig. 4 it will be seen that as the valve 40 opens, fresh air may enter through intake passage 85 to the chamber 86 as the valve is opened, and may be drawn or forced, or both, into the combustion chamber proper at 90 as the piston moves toward the crank.

On the return stroke of the piston, after charging, the fresh fuel is injected through the injector nozzle indicated generally at 95 (Fig. 2) and into the chamber 90 under the action of an injector force pump indicated at 98. The fuel pump is actuated by a reciprocating actuating member 99 moved by an injector cam 100 on the camshaft 60.

A passage 97 leads from the fuel pump 98 to the injector nozzle 99. The cam 100 is, of course, so shaped and positioned with relation to the intake and exhaust operating cams 65 and 66 as to effect the injection at or near the inner end of the piston stroke when the fresh charge of air is fully compressed. The injector nozzle is arranged to throw a spray or extremely fine streams of fuel at a precise angle between the slope of the upper surface 91 of the cylinder head and the top surface 31 of the piston 30.

The top surface of the piston may be of any desired contour adapted to coact with the cylinder head surface in such a way as to produce effective turbulence and desired intermixture of the injected fuel and the activated compressed air.

On the next return stroke of the piston, the exhaust valve opens and the burned gases pass out of an exhaust port similar to the intake 85.

Also mounted on the camshaft 60 is a cam 105 for operating a lubricating oil pump. The pump and connections for circulating the lubricating oil from the bottom of the crank case are shown somewhat diagrammatically in Fig. 9.

Figure 13:
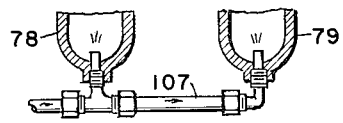
Fig. 13 is a fragmentary sectional view showing the connections of the oil line to the rocker arm housings.
Figure 9:
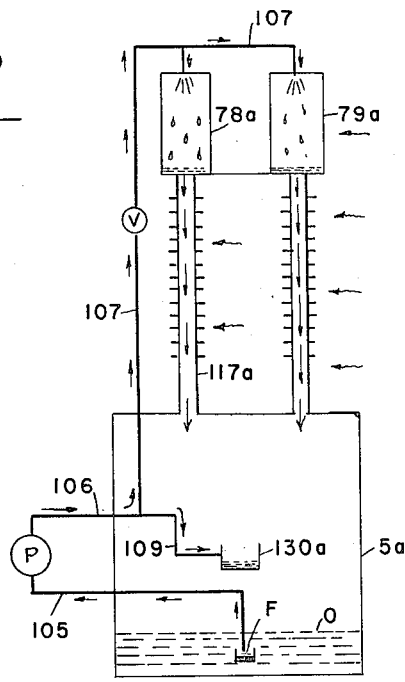
Fig. 9 is a diagrammatic view showing the system for circulating the lubricating and cooling oil.

Referring to the diagrammatic illustration of Fig. 9, the crank case is here designated 5a. Lubricating oil O gathers in the lower portion thereof. At F is indicated an oil sump and filter for an intake line 105 leading to the pump designated P, and from which the line 106 leads upwardly as indicated at 107, and shown as connected to both rocker arm housings 78a and 79a in the diagram. The oil is sprayed or forcibly thrown into both of the housings from the line 107 through suitable nozzles, as indicated in Fig. 13, and over the rocker arm and the valve stem in each of the housings 78 and 79. From these housings it drains downwardly through the passages 115 around the rods 70, as indicated by the arrows in Fig. 9 (the passages 117a corresponding to the passages 117 in the cylinder block) and returns to the crank housing. The discharge line of the pump 106 has a branch 109 leading back to a splash pan 130a.

In the diagram the passages 117a are shown as communicating with the crank casing. The arrangement of the connection of these passages at the lower end of the cylinder block may be seen particularly in Figs. 3, 4 and 8. The openings or passages 115 terminate in small receptacles 110 formed in the cylinder block, and connect with a common central cavity surrounding and above the opening 113 into which a projection of the fuel force pump 98 is fitted. From each of the receptacles 110 I provide downwardly opening elongated apertures 114 through which the oil passes, incidentally falling upon the camshaft. Thus, the oil passes downwardly through the passages 115 along the rods 170 and may be somewhat arrested in the cavities 110, assuring lubrication of the tappets 67 and 68 and pump tappet 99 before draining downwardly into the crank case through openings registering with the elongated opening 114, as indicated in the upper portion of Fig. 10.

It will be seen that the oil circulating over the rocker arms and downwardly along the heated portions of the combustion chamber and cylinder will be cooled by the action of the radiating fins, but, likewise, in cold weather the oil will be maintained at a warm and effective lubricating temperature by reason of the heat of the combustion chamber.

On the cylinder 15 are the cooling fins 116 shown as continued and connecting with the wall portion 117 as at 118 for effecting this cooling of the oil returning through the passage 115.

Similar cooling fins 119 are shown as provided on the cylinder head, and when the engine is in operation air may be forced to pass over all of these fins by reason of the motion of the engine through the air or by a stream from a cooling fan by any well known arrangement.

Fins 120 may be added adjacent to the intake and exhaust chambers across the top of the cylinder head member and transversely of the housings 78 and 79.

The cooling fins 119 extend along the intake passage member 85, and likewise along the exhaust passage, not shown.

A hood indicated only in broken lines 122 may surround the cylinder and cylinder head, and the flywheel 125 mounted on the crankshaft member 21 may be provided with impeller blades 126, integral therewith, for moving the air from an intake in the hood and upwardly and across the cooling vanes of the cylinder and cylinder head.

In Fig. 1 at 123 is indicated a baffle aiding upward flow of air, and another baffle for directing air over the lower portion of the cylinder assembly is indicated at 124 in Fig. 7.

Inwardly from the flywheel is shown a pulley 140 which may serve to drive a generator, if desired.

The splash pan or scoop 130a, mentioned in describing the diagram of Fig. 9, is shown at 130 in Fig. 2 as mounted on a boss 132 rising from the bottom member 1 of the base. This is preferably a trough-shaped member so positioned that the connecting rod journal 24 may dip into and splash oil therefrom as the crankshaft rotates after the manner of effecting splash lubrication, throwing oil to the crankshaft bearings, gears, camshaft, etc.

Figure 12:
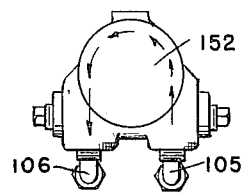
Fig. 12 is an end elevation of the oil pump, looking in the direction of the arrow at the large numeral 12 in Fig. 10.
Figure 10:
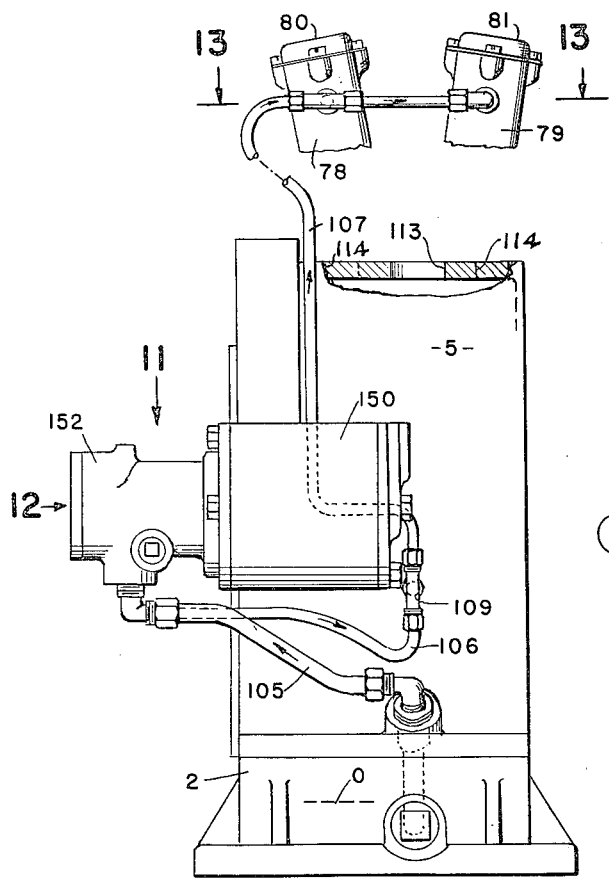
Fig. 10 is an elevation of a portion of the side of the engine crank casing, showing the oil pump and motor therefor and connection to the rocker arm housings.

The pump indicated at P in the diagram is also indicated as contained in the housing 152 (see Figs. 10, 11 and 12). The shaft for this pump may have a gear, not shown, driven by the camshaft gear 63, and also may drive a suitable governor contained in a housing 150 suitably mounted on the side of the crank case housing 5.

The connections to and from the pump are indicated in Figs. 10 and 13 by numbers corresponding to those in the diagram of Fig. 9.

At the upper portion of Fig. 10 is indicated the oil pump locating opening 113 and the registering return openings 114 pointed out on Figs. 4 and 8.

From the foregoing description it will be seen that the many advantages indicated in the statements of the objects are attained.

The crankshaft with its bearings and gears may be moved into position through the large opening 58 and be secured by closing the side of the crank case with the supporting disk or bell 57. The connecting rod and piston may be attached and properly tightened. This assembly may then be mounted on the base member. The cylinder is now set over the piston with its flange 10 fitting the opening in the top of the crank case, as described. The desired thickness of the gaskets 11 determine the desired height of the cylinder from the axis of the crank. The valve and rocker arm assembly, having been put together with the cylinder head, may now be placed on top of the cylinder and secured.

The generator pulley and flywheel may then be mounted on the crankshaft end 21, and any suitable driving member such as a pulley, coupling, clutch, or the like, may be connected to the member 20. The accessibility of the fuel pump 98 and its connections permits completing the assembly thereof in the most convenient order of steps.

Wear on the crankshaft bearings may be compensated by longitudinal adjustment, as described. The rocker arm pivot bearings and camshaft spindle are readily removable.

For ordinary running conditions the hood and air baffle for directing air from the flywheel impellers over the cooling vanes may be used, and, as indicated, this gives a very neat and compact appearance to the finished engine.

The features and advantages shown and described have resulted in producing an efficient, cheaply manufactured, lightweight, compact engine suitable for a wide variety of purposes. It has been found to operate very efficiently as a compression ignition oil-burning single cylinder engine. By slight modifications of design its essential features may be embodied in an engine of two or more cylinders. Obviously, various modifications may be made without detracting from the desirable characteristics set forth.

Having thus described my invention, what I claim is:

An engine including a crank and oppositely extending shafts therefor, tapered roller bearings surrounding the crankshafts, a crank case having side walls, one of said side walls having a large diameter opening through which the crank may be passed for assembly, a substantially flat circular closure member fitted into said opening and having a support for receiving one of the crankshaft bearings, shims between the perimeter of said closure and the housing, the thickness of which may be changed for adjusting the relative position of the bearings, the housing having a top wall, a cylinder supported thereon, a piston and connecting rod between it and the crankshaft, means for positioning the cylinder with its axis intersecting that of the crankshaft bearings, and means for adjusting the vertical height of the cylinder.

References Cited in the file of this patent

UNITED STATES PATENTS

| Number | Name | Date |
|---|---|---|
| 1,114,554 | Utz | Oct. 20, 1914 |
| 1,299,554 | Cosgray | Apr. 8, 1919 |
| 1,908,956 | Chievitz | May 16, 1933 |
| 1,966,905 | Ruth | July 17, 1934 |
| 2,190,394 | Birkigt | Feb. 13, 1940 |
| 2,307,926 | Griffith et al. | Jan. 12, 1943 |
| 2,371,797 | Brill | Mar. 20, 1945 |
| 2,394,675 | Fawick | Feb. 12, 1946 |
| 2,496,449 | Edens | Feb. 7, 1950 |
| 2,525,131 | Hallett | Oct. 10, 1950 |
| 2,560,244 | Pitts et al. | July 10, 1951 |
| 2,570,424 | Benjamin et al. | Oct. 9, 1951 |
| 2,584,289 | Rabe | Feb. 5, 1952 |
| 2,590,134 | Slonneger | Mar. 25, 1952 |